(12) United States Patent
Nagai et al.

(10) Patent No.: US 6,465,913 B1
(45) Date of Patent: Oct. 15, 2002

(54) POWER SOURCE UNIT

(75) Inventors: Tamiji Nagai, Kanagawa; Yoshisada Okayasu, Tokyo; Akio Nakamura, Kanagawa; Tsutomu Suda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 09/671,719

(22) Filed: Sep. 27, 2000

(30) Foreign Application Priority Data

Sep. 28, 1999 (JP) ............................................ 11-273940

(51) Int. Cl.⁷ ................................................. H02J 1/00
(52) U.S. Cl. ........................ 307/85; 307/112; 307/125; 307/126; 307/150
(58) Field of Search .............................. 307/85, 64, 66, 307/125, 112, 126, 150, 151; 363/37

(56) References Cited

U.S. PATENT DOCUMENTS

| | | | | |
|---|---|---|---|---|
| 4,395,639 A | * | 7/1983 | Bring | 307/66 |
| 5,811,895 A | * | 9/1998 | Suzuki et al. | 307/125 |
| 5,814,972 A | * | 9/1998 | Shimada et al. | 320/132 |
| 6,075,345 A | * | 6/2000 | Lee | 320/138 |

\* cited by examiner

*Primary Examiner*—Brian Sircus
*Assistant Examiner*—Robert L DeBeradinis
(74) *Attorney, Agent, or Firm*—Frommer Lawrence & Haug LLP; William S. Frommer; Gordon Kessler

(57) ABSTRACT

A power source unit is constructed by an AC/DC switching power source circuit 12, a battery unit 16, switching circuits 13 and 15, detecting circuits 18 and 21 corresponding to the switching circuits 13 and 15, and stop signal forming circuits 19 and 20. In the supplying mode, the power source circuit 12 is made operative, the switching circuit 13 is turned on, an output voltage formed by the power source circuit 12 is supplied to the load side, and at the same time, the switching circuit 15 is turned off by a stop output from the stop signal forming circuit 20. In the charging mode, the power source circuit 12 is made operative, the switching circuit 15 is turned on, the output voltage formed by the power source circuit 12 is supplied to the battery unit 16, and at the same time, the switching circuit 13 is turned off by a stop output of the stop signal forming circuit 19.

3 Claims, 5 Drawing Sheets

POWER SOURCE UNIT

BACKGROUND OF THE INVENTION

1. Field of the Invention

The invention relates to a power source unit which has a secondary battery and an AC adapter therein and is suitable for use as a power source of, for example, a portable personal computer.

2. Description of the Related Art

In recent years, various portable personal computers of a light weight, a small size, and a high operability have been proposed in association with development of a liquid crystal technology. For example, as for the size, the portable personal computers of the A4 or B5 size have generally been widespread. Many compact digital cameras, camera integrated type VTRs, and the like have been put into practical use in association with the development of the electronic image technique. Those camera apparatuses have an excellent using efficiency in terms of easiness of image processes, easy operation of a reproducing process, and the like, so that they are generally and preferably used in association with the spread of personal computers. Further, cellular phones have also been widespread to each home and become common owing to the development of the communicating technique and the widespread of communication services. Portable information terminals called PDA (Personal Digital Assistants) have also been put into practical use. Such a PDA is a multipurpose terminal having a telephone function using a digital radio telephone system called PHS (Personal Handy Phone System), a communicating function for communicating with a personal computer, a facsimile apparatus, or the like, and a function called an electronic notebook and has about a size of a palm.

In those portable electronic apparatuses, ordinarily, a secondary battery which is reusable by charging is used for an economic reason or the like, and when they are carried, a battery unit comprising a plurality of secondary batteries which are serially connected is used as a DC power source, and an internal electronic circuit is driven by an output of such a battery.

Upon charging, in a portable personal computer or a PDA, since a charging circuit of the secondary battery is provided integratedly with the main body side, it is sufficient to merely prepare an AC adapter. That is, in case of using such a personal computer or a PDA indoors or the like, that is, at a place where a commercially available power source or the like has been arranged, an AC power source of 100V is converted into a predetermined DC voltage by the AC adapter, the internal electronic circuit is driven by an output of the DC voltage, the secondary battery is disconnected from a power line, and the charging circuit is made operative, thereby charging the secondary battery.

On the other hand, in a cellular phone, a digital camera, or the like in which the charging circuit of the secondary battery is not provided integratedly with the main body side but a DC/DC converter for regulating an output voltage of the secondary battery is installed, the relation between the secondary battery and the main body side is unclear and dedicated charging devices are necessary. Each of those dedicated charging devices is constructed by an AC adapter, a charging circuit, and the like, the main body or a battery unit is installed to the dedicated charging device when it is not carried, and the secondary battery is charged.

In the case where the charging and discharging are simultaneously performed to/from the secondary battery, however, not only the output voltage is not set to a predetermined value but also the secondary battery is accompanied with a heat generation or a vibration, and an inconvenience occurs. Therefore, a power source unit having a higher safety in which the charging and discharging to/from the secondary battery can be strictly managed is demanded.

OBJECTS AND SUMMARY OF THE INVENTION

It is, therefore, an object of the invention to provide a power source unit having a higher safety in which the charging and discharging to/from the secondary battery can be strictly managed.

To solve the above problems, according to the invention of claim 1, there is provided a power source unit which is arranged between a commercially available power source and an electronic apparatus having a secondary battery therein and supplies an output voltage to the electronic apparatus, comprising: voltage converting means for converting a voltage of the commercially available power source into a predetermined regulated DC voltage which is necessary for the electronic apparatus; a battery unit constructed by a plurality of secondary batteries; first switching means which is inserted between the voltage converting means and the battery unit; second switching means which is inserted between the voltage converting means and a power output terminal; and control means for turning off the second switching means when the first switching means is ON and turning off the first switching means when the second switching means is ON.

According to the invention, the voltage converting means, battery unit, first and second switching means, and control means are provided. For example, when the power source unit is set to a supplying mode, the voltage converting means is made operative, the second switching means is turned on, and the output voltage formed by the voltage converting means is supplied to the load side. In this state, the first switching means is controlled by a stop output from the control means, so that it is not turned on at all. When the power source unit is set to a charging mode, the voltage converting means is made operative, the first switching means is turned on, and the output voltage formed by the voltage converting means is supplied to the battery unit. In this state, the second switching means is controlled by the stop output from the control means, so that it is not turned on at all. In any setting mode, therefore, the first and second switching means are not simultaneously turned on and the safety is more raised.

The above and other objects and features of the present invention will become apparent from the following detailed description and the appended claims with reference to the accompanying drawings.

DETAILED DESCRIPTION OF THE PREFERRED EMBODIMENTS

Figure 1:
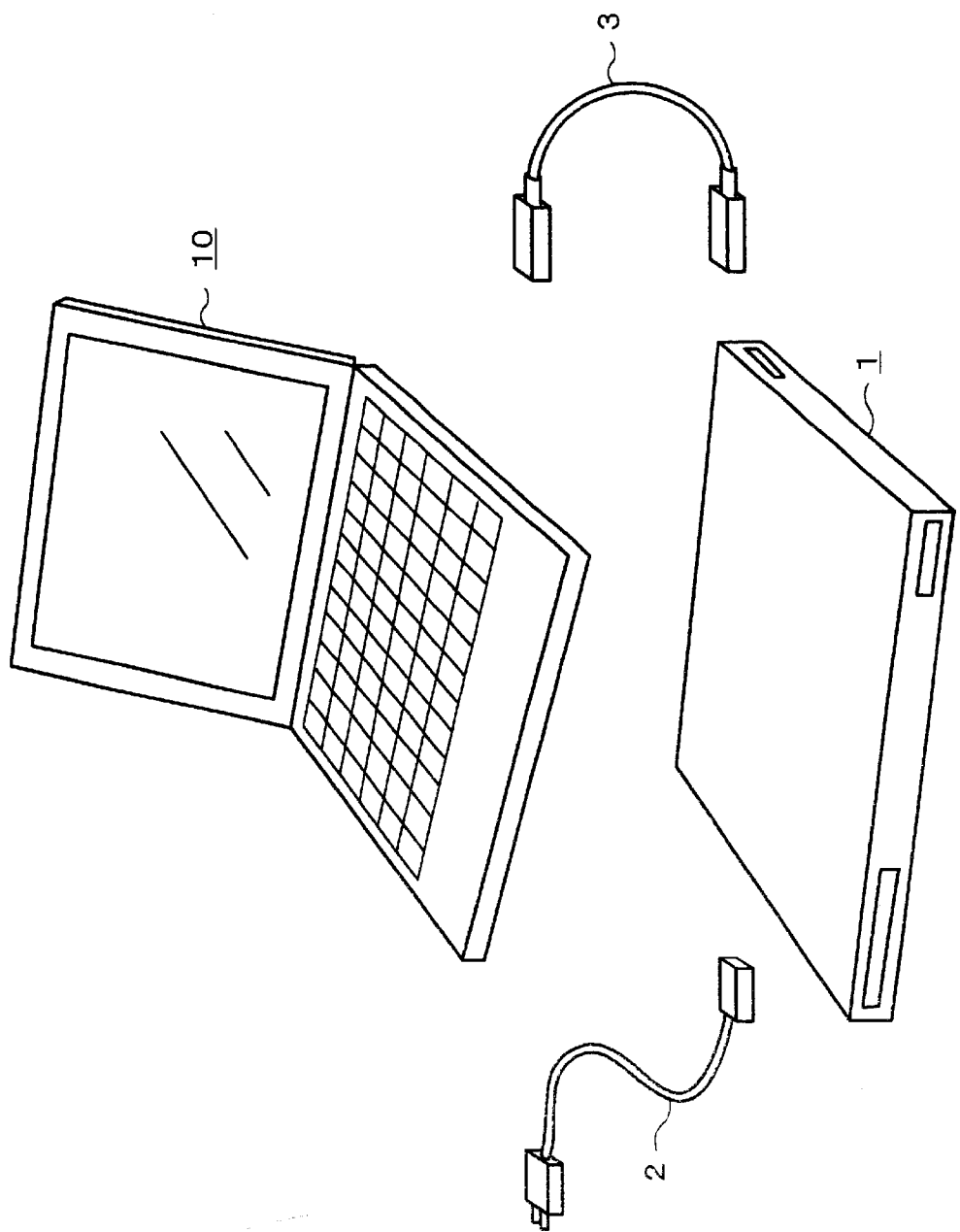
FIG. 1 is a perspective view of an apparatus to which the invention is applied.

An embodiment of the invention will now be described hereinbelow with reference to the drawings. FIG. 1 shows an external view of the first embodiment to which the invention is applied. In FIG. 1, a case of driving a personal computer 10 is shown as an example of a case of driving an electronic apparatus by a power source unit 1. The personal computer 10 can be mounted on the power source unit 1. A power supply to the personal computer 10 is performed by pulling out a connecting cord 3 enclosed in the bottom surface of the power source unit 1 and connecting it to the personal computer 10 in this state. A power supply to the power source unit 1 is performed by connecting an AC inlet (not shown) arranged in the side surface of the power source unit 1 to a commercially available power source by an AC cord 2. Although not shown, an LED to display a capacity of a battery is arranged on the side surface of the power source unit 1, so that a residual capacity of the battery can be confirmed while using the personal computer 10.

For example, the power source unit 1 has almost the same external dimensions as those of the personal computer 10 and can drive the personal computer by the built-in battery for a long time.

Figure 2:
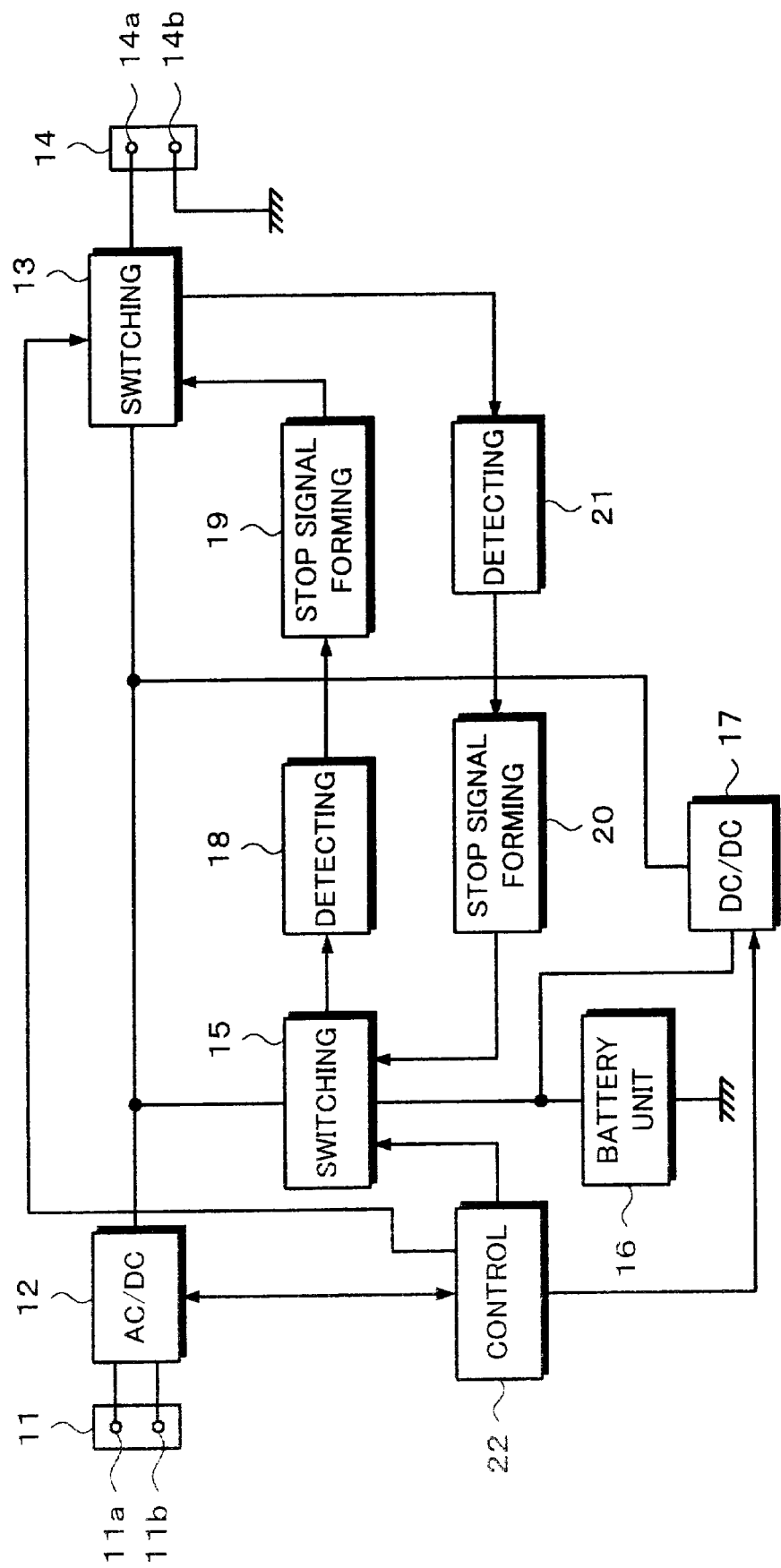
FIG. 2 is a block diagram showing a whole construction of an embodiment of the invention.

FIG. 2 shows a whole construction of the embodiment of the invention. As shown in FIG. 2, the embodiment of the invention comprises: an AC/DC switching power source circuit 12; two switching circuits 13 and 15; a battery unit 16; a DC/DC switching power source circuit 17; two detecting circuits 18 and 21; two stop signal forming circuits 19 and 20; a control circuit 22; and the like.

In FIG. 2, reference numeral 11 denotes an AC inlet for connecting the power source unit 1 to the commercially available power source and 14 indicates a connector for connecting the power source unit 1 to an electronic apparatus as a load. A power voltage from the commercially available power source is supplied to the AC/DC switching power source circuit 12 through a pair of power input terminals 11a and 11b of the AC inlet. In response to a control signal from the control circuit 22, the AC/DC switching power source circuit 12 regulates an AC voltage of 100V which is inputted to a predetermined DC voltage that is necessary by the load side connected to the connector 14 and outputs the DC voltage. The output voltage formed by the AC/DC switching power source circuit 12 is supplied to input terminals of the switching circuits 13 and 15.

An output terminal of the switching circuit 13 is connected to one (14a) of the terminals of the connector 14. The other terminal 14b of the connector 14 is connected to the ground. A+side of the battery unit 16 is connected to an output terminal of the switching circuit 15.

The switching circuit 13 has two control terminals and is turned on in accordance with the states of the two control terminals. A control signal from the control circuit 22, which will be explained hereinlater, is supplied to one of the control terminals and a stop output from the stop signal forming circuit 19 is supplied to the other control terminal. A state of the switching circuit 13 is detected by the detecting circuit 21. A detection output of the detecting circuit 21 is supplied to the stop signal forming circuit 20. The stop signal forming circuit 20 forms a stop output for turning off the switching circuit 15 on the basis of the detection output of the detecting circuit 21 when the switching circuit 13 is ON.

The switching circuit 15 has two control terminals and is turned on in accordance with the states of the two control terminals. A control signal from the control circuit 22, which will be explained hereinlater, is supplied to one of the control terminals and the stop output from the stop signal forming circuit 20 is supplied to the other control terminal. A state of the switching circuit 15 is detected by the detecting circuit 18. A detection output of the detecting circuit 18 is supplied to the stop signal forming circuit 19. The stop signal forming circuit 19 forms a stop output for turning off the switching circuit 13 on the basis of the detection output of the detecting circuit 18 when the switching circuit 15 is ON. This stop output is supplied to the other control terminal of the switching circuit 13.

For example, the battery unit 16 is formed by using a plurality of nonaqueous secondary batteries of lithium ion batteries. A minus (−) side of the battery unit is connected to the ground. The DC/DC switching power source circuit 17 regulates an output voltage of the battery unit 16 to a predetermined DC voltage which is necessary on the load side connected to the connector 14 in accordance with the control signal from the control circuit 22 and outputs it. The output voltage formed by the DC/DC switching power source circuit 17 is supplied to an input terminal of the switching circuit 13.

The control circuit 22 for controlling each section as mentioned above is mainly constructed by a microcomputer. The control circuit 22 monitors operating states of a power-on switch, a mode setting switch, and the like, a detection output of a protecting circuit, and the like although not shown, forms a control signal in accordance with each state, and supplies the control signal to each section, thereby concentratedly managing the whole power source unit.

For example, in the case where the power switch is turned on and the power source unit is set to a supplying mode in a state where the commercially available power voltage has been supplied to the AC inlet 11, the control circuit 22 makes the AC/DC switching power source circuit 12 operative, turns on the switching circuit 13, and makes the DC/DC switching power source circuit 17 inoperative. In this case, therefore, the output voltage of the AC/DC switching power source circuit 12 is supplied to the load side via the switching circuit 13 and connector 14. In this state, the switching circuit 15 is controlled by the stop output of the stop signal forming circuit 20 and is not turned on at all. In this state, when an abnormality is detected by the protecting circuit, the control circuit 22 makes the AC/DC switching power source circuit 12 inoperative and turns off the switching circuit 13.

On the other hand, in the case where the power switch is turned on and the power source unit is set to a charging mode in a state where the commercially available power voltage has been supplied to the AC inlet 11, the control circuit 22 makes the AC/DC switching power source circuit 12 operative, turns on the switching circuit 15, and makes the DC/DC switching power source circuit 17 inoperative. In this case, therefore, the output voltage of the AC/DC switching power source circuit 12 is supplied to the battery unit 16 side via the switching circuit 15. In this state, the switching circuit 13 is controlled by the stop output of the stop signal forming circuit 19 and is not turned on at all. In this state, when an abnormality is detected by the protecting circuit, the control circuit 22 makes the AC/DC switching power source circuit 12 inoperative and turns off the switching circuit 15.

On the other hand, in the case where the power switch is turned on in a state where the commercially available power voltage is not supplied to the AC inlet 11, the control circuit 22 turns on the switching circuit 13 and makes the DC/DC switching power source circuit 17 operative. In this case, therefore, the output voltage formed by the DC/DC switching power source circuit 17 by the electric power of the battery unit 16 is supplied to the load side via the switching circuit 13 and connector 14. In this state, the switching circuit 15 is controlled by the stop output of the stop signal forming circuit 20 and is not turned on at all. In this state, when an abnormality is detected by the protecting circuit, the control circuit 22 makes the DC/DC switching power source circuit 17 inoperative and turns off the switching circuit 13.

Figure 3:
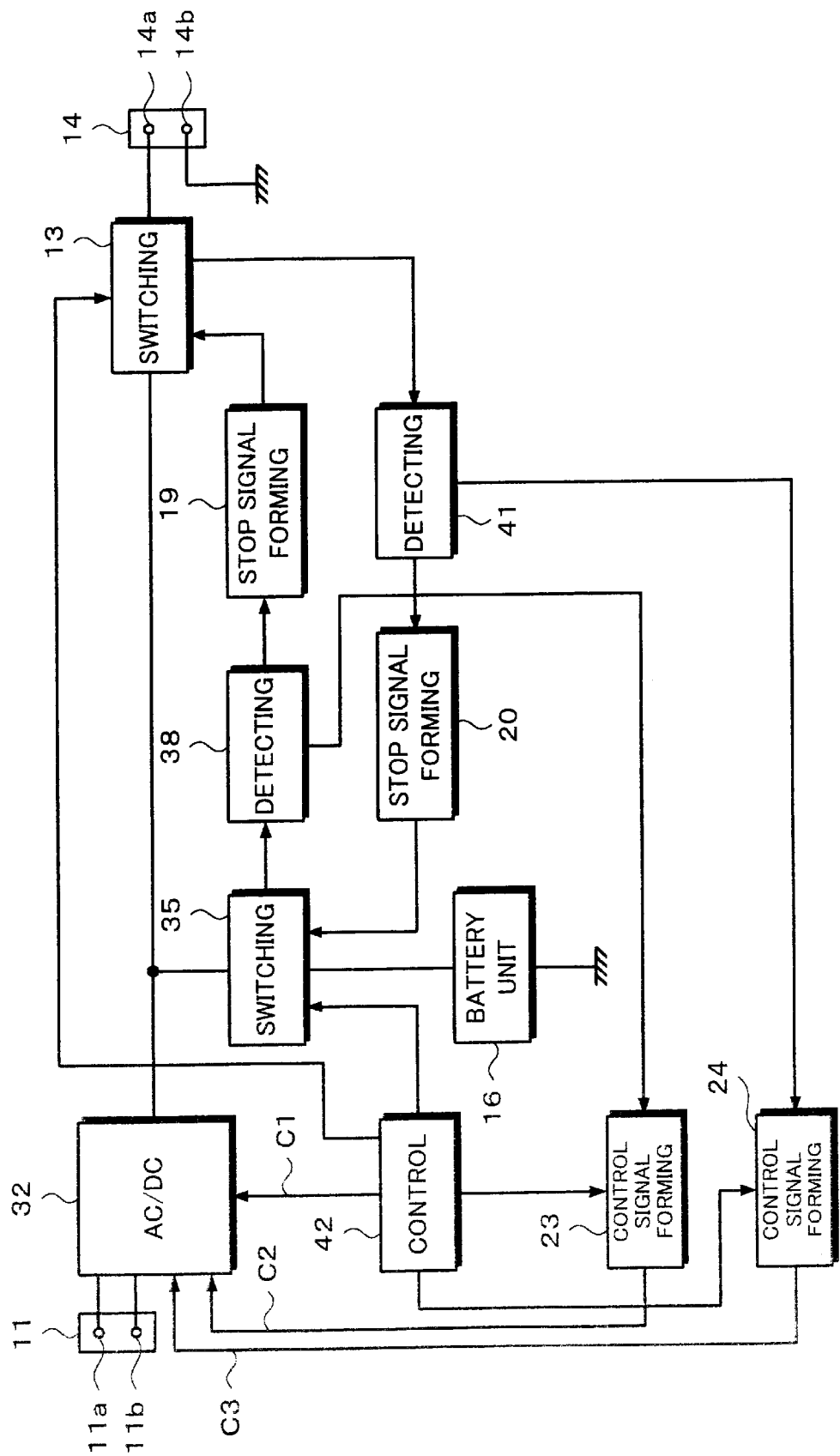
FIG. 3 is a block diagram showing a whole construction of another embodiment of the invention.

FIG. 3 shows a whole construction of another embodiment of the invention. As shown in FIG. 3, another embodiment of the invention comprises: an AC/DC switching power source circuit 32; two switching circuits 13 and 35; the battery unit 16; two detecting circuits 38 and 41; the two stop signal forming circuits 19 and 20; a control circuit 42; two control signal forming circuits 23 and 24; and the like. In FIG. 3, portions corresponding to those in FIG. 2 are designated by the same reference numerals and an explanation of the common portions is omitted here.

The AC/DC switching power source circuit 32 has three control terminals and regulates the AC voltage of 100V which is inputted into a predetermined DC voltage V1 which is necessary on the load side connected to the connector 14 and outputs it or regulates the inputted AC 100V into a predetermined DC voltage V2 which is necessary to charge the battery unit 16 and outputs it in response to a control signal C1 from the control circuit 42 and control signals C2 and C3 from the two control signal forming circuits 23 and 24, respectively. An output voltage formed by the AC/DC switching power source circuit 32 is supplied to input terminals of the switching circuits 13 and 35, respectively.

The switching circuit 13 has two control terminals and is turned on in accordance with states of those two control terminals. The control signal from the control circuit 42, which will be explained hereinlater, is supplied to one of the two control terminals and the stop output from the stop signal forming circuit 19 is supplied to the other control terminal. The state of the switching circuit 13 is detected by the detecting circuit 41. A detection output of the detecting circuit 41 is supplied to the stop signal forming circuit 20 and supplied to the control signal forming circuit 24. When the switching circuit 13 is ON, the stop signal forming circuit 20 forms the stop output for turning off the switching circuit 35 on the basis of the detection output of the detecting circuit 41. This stop output is supplied to a second control terminal of the switching circuit 35.

The control signal from the control circuit 42 is supplied to the control signal forming circuit 24. When the switching circuit 13 is ON, the control signal forming circuit 24 forms the control signal C3 for controlling so that the output voltage of the AC/DC switching power source circuit 32 is equal to a predetermined output voltage on the basis of the control signal from the control circuit 42 and the detection output of the detecting circuit 41. The control signal C3 is supplied to the AC/DC switching power source circuit 32.

The switching circuit 35 has two control terminals and is turned on in accordance with states of those two control terminals. The control signal from the control circuit 42, which will be explained hereinlater, is supplied to the first control terminal and the stop output from the stop signal forming circuit 20 is supplied to the second control terminal. The state of the switching circuit 35 is detected by the detecting circuit 38. A detection output of the detecting circuit 38 is supplied to the stop signal forming circuit 19 and supplied to the control signal forming circuit 23. When the switching circuit 35 is ON, the stop signal forming circuit 19 forms the stop output for turning off the switching circuit 13 on the basis of the detection output of the detecting circuit 38. This stop output is supplied to the other control terminal of the switching circuit 13.

The control signal from the control circuit 42 is supplied to the control signal forming circuit 23. When the switching circuit 35 is ON, the control signal forming circuit 23 forms the control signal C2 for controlling so that the output voltage of the AC/DC switching power source circuit 32 is equal to a predetermined output voltage on the basis of the control signal from the control circuit 42 and the detection output of the detecting circuit 38. The control signal C2 is supplied to the AC/DC switching power source circuit 32.

The control circuit 42 for controlling each section as mentioned above is mainly constructed by a microcomputer. The control circuit 42 monitors operating states of the power-on switch, mode setting switch, and the like, the detection output of the protecting circuit, and the like although not shown, forms a control signal in accordance with each state, and supplies the control signal to each section, thereby concentratedly managing the whole power source unit.

For example, in the case where the power switch is turned on and the power source unit is set to the supplying mode in a state where the commercially available power voltage has been supplied to the AC inlet 11, the control circuit 42 makes the AC/DC switching power source circuit 32 operative and controls so as to validate the control signal C3 of the control signal forming circuit 24. In this case, therefore, the predetermined DC voltage V1 which is necessary on the load side is formed by the AC/DC switching power source circuit 32, and this output voltage is supplied to the load side via the switching circuit 13 and connector 14.

In this state, the switching circuit 35 is controlled by the stop output of the stop signal forming circuit 20 and is not turned on at all. In this state, when an abnormality is detected by the protecting circuit, the control circuit 42 makes the AC/DC switching power source circuit 32 inoperative and turns off the switching circuit 13.

On the other hand, in the case where the power switch is turned on and the power source unit is set to the charging mode in a state where the commercially available power voltage has been supplied to the AC inlet 11, the control circuit 42 makes the AC/DC switching power source circuit 32 operative and controls so as to validate the control signal C3 of the control signal forming circuit 24. In this case, therefore, the predetermined DC voltage V2 which is necessary to charge the battery unit 16 is formed by the AC/DC switching power source circuit 32, and this output voltage is supplied to the battery unit 16 side via the switching circuit 35. In this state, the switching circuit 13 is controlled by the stop output of the stop signal forming circuit 20 and is not turned on at all. In this state, when an abnormality is detected by the protecting circuit, the control circuit 42 makes the AC/DC switching power source circuit 32 inoperative and turns off the switching circuit 35.

On the other hand, in the case where the power switch is turned on in a state where the commercially available power voltage is not supplied to the AC inlet 11, the control circuit 42 forms the control signal for turning on the switching circuit 13 and invalidating the stop output of the stop signal forming circuit 20 and turns on the switching circuit 35. In this case, therefore, the output voltage of the battery unit 16 is supplied to the load side via the switching circuits 35 and 13 and the connector 14. In this state, when an abnormality is detected by the protecting circuit, the control circuit 42 turns off the switching circuit 35 and turns off the switching circuit 13. The other embodiment is used in the case where the DC/DC switching power source circuit for regulating the voltage from the power source unit is provided in the electronic apparatus serving as a load or the case where an input voltage range of the electronic apparatus as a load is large.

Figure 4:
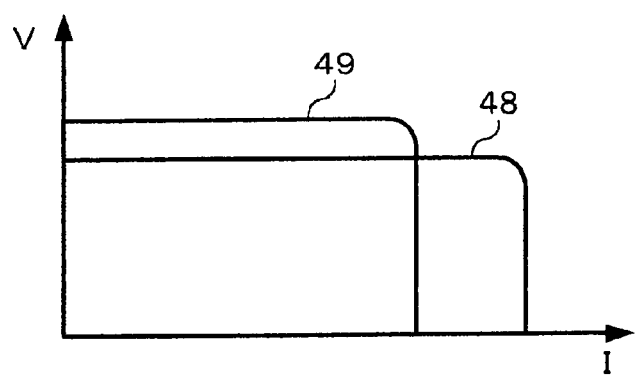
FIG. 4 is a characteristics diagram for use in explanation of the operation in another embodiment of the invention.

FIG. 4 is a characteristics diagram showing a specific example of an operating state in another embodiment of the invention. For example, it is assumed that the battery unit 16 comprises total twelve lithium ion batteries formed by serially connecting four lithium ion batteries each of which is constructed by connecting three lithium ion batteries in parallel and that an upper limit voltage upon charging is set to, for example, 4.2V. It is also assumed that a portable electronic apparatus is connected to the connector 14 and an input voltage of this electronic apparatus is set to, for example, 16V.

In the supplying mode in this case, by validating the control signal C2 as shown by a solid line 48 in FIG. 4 and making the AC/DC switching power source circuit 32 operative, the output voltage of 16V is supplied to the electronic apparatus. In the charging mode, by validating the control signal C3 as shown by a solid line 49 in FIG. 4 and making the AC/DC switching power source circuit 32 operative, the output voltage of 17V (upper limit voltage: 4.2×4=16.8 V) is supplied to the battery unit 16.

Figure 5:
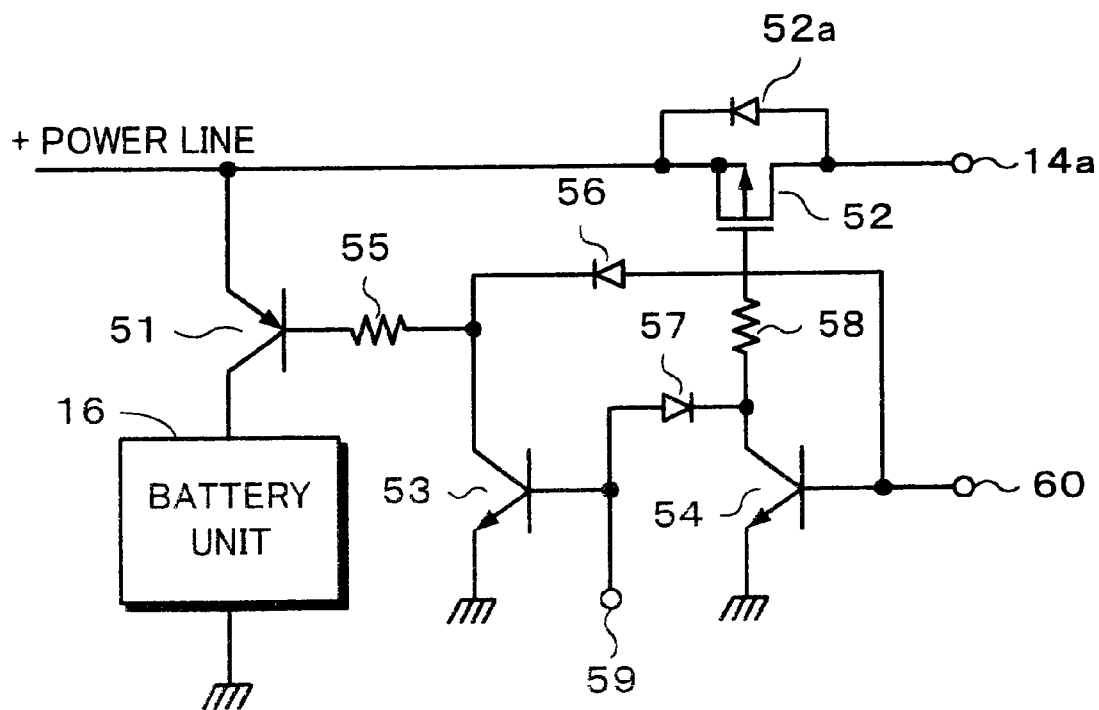
FIG. 5 is a circuit diagram showing a specific example of a main portion in the embodiment of the invention.

FIG. 5 shows an example of a specific circuit for performing the operation that is equivalent to the operation which is executed by the switching circuits 13 and 15, detecting circuits 18 and 21, and stop signal forming circuits 19 and 20 in the foregoing embodiment. A source of an MOSFET (Metal Oxide Semiconductor Field Effect Transistor) 52 of a p channel type is connected to an output terminal of the AC/DC switching power source circuit 12 shown in FIG. 2. The terminal 14a of the connector 14 is connected to a drain of the MOSFET 52. A diode 52a is a parasitic diode. A gate of the MOSFET 52 is connected to a collector of an npn type transistor 54 via a resistor 58. An emitter of the transistor 54 is connected to the ground.

An emitter of a pnp type transistor 51 is connected to the output terminal of the AC/DC switching power source circuit 12. A plus (+) side of the battery unit 16 is connected to a collector of the transistor 51. The minus (−) side of the battery unit 16 is connected to the ground. A base of the transistor 51 is connected to a collector of an npn type transistor 53 via a resistor 55. An emitter of the transistor 53 is connected to the ground.

A control terminal 60 is led out from a base of the transistor 54. A diode 56 is connected between the base of the transistor 54 and the collector of the transistor 53 so as to be arranged in the forward direction from the base of the transistor 54 toward the collector of the transistor 53. A control terminal 59 is led out from a base of the transistor 53. A diode 57 is connected between the base of the transistor 53 and the collector of the transistor 54 so as to be arranged in the forward direction from the base of the transistor 53 toward the collector of the transistor 54. As diodes 56 and 57, diodes each having a forward voltage smaller than a voltage obtained by adding a bias voltage VBE of each of the transistors 53 and 54 and a voltage VCE between the collector and emitter of each of them in the ON state are selected. For example, assuming that the bias voltage VBE of each of the transistors 53 and 54 lies within a range from 0.6 to 0.7 V, transistors of a low voltage such as Schottky diodes or the like whose forward voltage VF is equal to about 0.4V are used.

For the circuit constructed as mentioned above, in the supplying mode, a voltage that is sufficiently higher than the bias voltage VBE is applied as a control signal to the control terminal 60 via a limiting resistor. Therefore, since the transistor 54 is turned on, the gate of the MOSFET 52 is controlled to the low level, the MOSFET 52 is turned on, and the output voltage of the AC/DC switching power source circuit 12 is taken out through the MOSFET 52. At this time, even if the voltage that is sufficiently higher than the bias voltage VBE was applied as a control signal to the control terminal 59 via a limiting resistor, since the voltage at the base of the transistor 53 is fixed to almost the forward voltage of the diode 57, the transistor 53 is not turned on at all.

In case of the charging mode, on the contrary, the voltage that is sufficiently higher than the bias voltage VBE is applied as a control signal to the control terminal 59 via the limiting resistor. Therefore, since the transistor 53 is turned on, the base of the transistor 51 is controlled to the low level, the transistor 51 is turned on, and the output voltage of the AC/DC switching power source circuit 12 is applied to the battery unit 16 via the transistor 51. At this time, even if the voltage that is sufficiently higher than the bias voltage VBE was applied as a control signal to the control terminal 60 via the limiting resistor, since the voltage at the base of the transistor 54 is fixed to almost the forward voltage of the diode 56, the transistor 54 is not turned on at all.

Although the case of using the MOSFET 52 and transistors 51, 53, and 54 as switching devices has been described above, other switching devices can be also used. For example, a pnp type transistor can be substituted for the MOSFET 52, a p channel type MOSFET can be substituted for the transistor 51, and n channel type MOSFETs can be substituted for the transistors 53 and 54. In case of substituting the n channel type MOSFETs for the transistors 53 and 54, it is sufficient to use diodes whose forward voltages are equal to or lower than an ON voltage of the MOSFET as diodes 56 and 57 and general silicon diodes whose forward voltage lies within a range from 0.7 to 1.0 V can be used.

Figure 6:
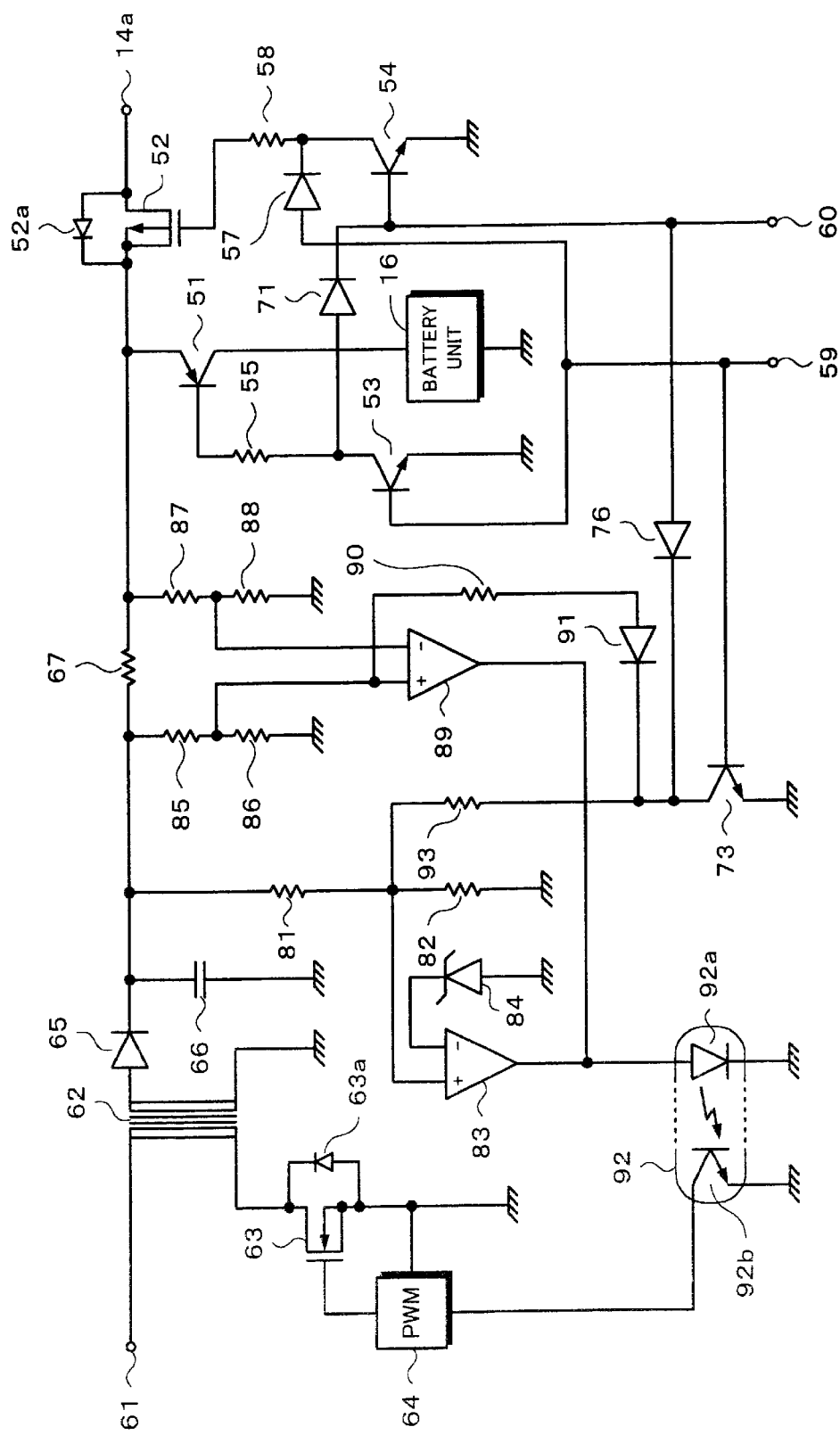
FIG. 6 is a circuit diagram showing a specific example of a main section of another embodiment of the invention.

FIG. 6 shows an example of a specific circuit for performing the operation that is equivalent to the operation which is executed by the AC/DC switching power source circuit 32, switching circuits 13 and 35, detecting circuits 38 and 41, stop signal forming circuits 19 and 20, and control signal forming circuits 23 and 24 in the foregoing other embodiment. In FIG. 6, portions corresponding to those in FIG. 5 are designated by the same reference numerals and an explanation of the common portions is omitted here.

A main portion of the AC/DC switching power source circuit 32 will be first described. In FIG. 6, reference numeral 62 denotes a switching transformer. A terminal 61 is led out from one end of a primary coil of the switching transformer 62. Although not shown, a DC voltage which is obtained by full-wave rectifying and smoothing the commercially available power voltage by a rectifying bridge is supplied to the terminal 61. A drain of an n channel type MOSFET 63 is connected to the other end of the primary coil of the switching transformer 62. A source of the MOSFET 63 is connected to the ground. A diode 63a is a parasitic diode. A PWM output from a PWM control circuit 64 is supplied to a gate of the MOSFET 63. A collector of a phototransistor 92b constructing a photocoupler 92 is connected to a control terminal of the PWM control circuit 64. An emitter of the phototransistor 92b is connected to the ground.

An anode of a rectifying diode 65 is connected to one end of a secondary coil of the switching transformer 62. A cathode of the rectifying diode 65 is connected to the ground via a capacitor 66. One end of a resistor 67 for current detection is connected to a node of the rectifying diode 65 and capacitor 66. The other end of the secondary coil of the switching transformer 62 is connected to the ground.

The node of the rectifying diode 65 and capacitor 66 is connected to the ground via resistors 81 and 82 which are serially connected. A node of the resistors 81 and 82 is connected to a non-inverting input terminal of a differential amplifier 83. A Zener diode 84 as a reference voltage source is connected to an inverting input terminal of the differential amplifier 83. An output voltage detecting circuit is constructed by the resistors 81 and 82, Zener diode 84, and differential amplifier 83.

Further, the node of the rectifying diode 65 and capacitor 66, namely, one end of the resistor 67 is connected to the ground via resistors 85 and 86 which are serially connected. A node of the resistors 85 and 86 is connected to a non-inverting input terminal of a differential amplifier 89. The other end of the resistor 67 is connected to the ground via resistors 87 and 88 which are serially connected. A node of the resistors 87 and 88 is connected to an inverting input terminal of the differential amplifier 89. An output current detecting circuit is constructed by the resistors 67, 85, 86, 87, and 88 and differential amplifier 89.

An output terminal of the differential amplifier 83 of the output voltage detecting circuit and an output terminal of the differential amplifier 89 of the output current detecting circuit are connected. An anode of an infrared ray LED 92a constructing the photocoupler 92 is connected to such a common node. A cathode of the infrared ray LED 92a is connected to the ground. For example, when an output current lies within an ordinary range, the infrared ray LED 92a is driven by an output of the differential amplifier 83 on the output voltage detecting circuit side and the PWM control circuit 64 is controlled in accordance with an output voltage of the phototransistor 92b.

Specifically speaking, a voltage of the Zener diode 84 and a voltage obtained by dividing a voltage on the side of one end of the resistor 67 by the resistors 81 and 82 are compared by the differential amplifier 83 and an amplification output of a difference between them is generated. The infrared ray LED 92a is driven by the output of the differential amplifier 83 and the PWM control circuit 64 is controlled. Therefore, when the voltage on the side of one end of the resistor 67 is lower than a target specified voltage, a pulse width serving as an ON interval of the MOSFET 63 is widened. When the voltage on the side of one end of the resistor 67 is higher than the target specified voltage, contrarily, the pulse width is narrowed. Thus, the voltage on the side of one end of the resistor 67 is regulated to a predetermined value.

When the output current is out of the ordinary range and an overcurrent flows, the infrared ray LED 92a is driven by an output of the differential amplifier 89 on the output current detecting circuit side and the PWM control circuit 64 is controlled in accordance with the output voltage of the phototransistor 92b.

Specifically speaking, a voltage obtained by dividing the voltage on the side of one end of the resistor 67 by the resistors 85 and 86 and a voltage obtained by dividing a voltage on the side of the other end of the resistor 67 by the resistors 87 and 88 are compared by the differential amplifier 89 and an amplification output of a difference between them is generated. The infrared ray LED is driven by the output of the differential amplifier 89 and the PWM control circuit 64 is controlled. Therefore, the pulse width is controlled so as to be narrowed and the output current is limited.

The source of the MOSFET 52 mentioned above and the emitter of the transistor 51 are connected to the other end of the resistor 67 of the AC/DC switching power source circuit 32 constructed as mentioned above. Although the diode 56 is connected between the base of the transistor 54 and the collector of the transistor 53 so as to be arranged in the forward direction from the base of the transistor 54 toward the collector of the transistor 53 in the foregoing example, a diode 71 is connected between the base of the transistor 54 and the collector of the transistor 53 so as to be arranged in the forward direction from the collector of the transistor 53 toward the base of the transistor 54 as shown in FIG. 6 in the case of this example.

One end of a resistor 93 is connected to the node of the resistors 81 and 82 of the output voltage detecting circuit. The other end of the resistor 93 and a collector of an npn type transistor 73 are connected. An emitter of the transistor 73 is connected to the ground. The node of the resistors 85 and 86 of the output current detecting circuit and one end of a resistor 90 are connected. The other end of the resistor 90 is connected to an anode of a diode 91 and a cathode of the diode 91 is connected to the collector of the transistor 73. Further, a diode 76 is connected between the base of the transistor 54 and the collector of the transistor 73 so as to be arranged in the forward direction from the base of the transistor 54 toward the collector of the transistor 73. A base of the transistor 73 and the base of the transistor 53 are connected.

For the circuit constructed as mentioned above, in case of the supplying mode, a voltage which is sufficiently higher than the bias voltage VBE is applied as a control signal to the control terminal 60 through a limiting resistor. Therefore, since the transistor 54 is turned on, the gate of the MOSFET 52 is controlled to the low level, the MOSFET 52 is turned on, and the output voltage of the AC/DC switching power source circuit 32 is taken out through the MOSFET 52. At this time, even if the voltage which is sufficiently higher than the bias voltage VBE was applied as a control signal to the control terminal 59 through a limiting resistor, since the voltages at the bases of both the transistors 53 and 73 are fixed to almost the forward voltage of the diode 57, both of them are not simultaneously turned on.

In case of the charging mode, contrarily, a voltage which is sufficiently higher than the bias voltage VBE is applied as a control signal to the control terminal 59 through a limiting resistor. Therefore, since the transistor 53 is turned on, the base of the transistor 51 is controlled to the low level, the transistor 51 is turned on, and the output voltage of the AC/DC switching power source circuit 32 is applied to the battery unit 16 through the transistor 51. At the same time, the transistor 73 is turned on and a state where the resistor 93 is connected in parallel with the resistor 82 of the output voltage detecting circuit is obtained. Therefore, the voltage at the non-inverting input terminal is lower than the voltage at the inverting input terminal. The infrared ray LED 92a is driven by the output of the differential amplifier 83 and the PWM control circuit 64 is controlled. Therefore, the pulse width is controlled so as to be widened and the output voltage is regulated to a predetermined value higher than that in the supplying mode. In this instance, even if the voltage which is sufficiently higher than the bias voltage VBE was applied as a control signal to the control terminal 60 through a limiting resistor, since the voltage at the base of the transistor 54 is fixed to almost the forward voltage of the diode 76, the transistor 54 is not turned on at all.

Although the case where the DC/DC switching power source circuit 17 is made operative/inoperative by the control signal from the control circuit 22 has been described in the foregoing embodiment, it is also possible to construct the power source unit in a manner such that a switching circuit is inserted between the (+) side of the battery unit 16 and the input terminal of the DC/DC switching power source circuit 17, the switching circuit is controlled by the control circuit 22, and the DC/DC switching power source circuit 17 is disconnected from the current path, thereby making the DC/DC switching power source circuit 17 inoperative. In case of inserting the switching circuit for disconnecting the battery unit 16 and DC/DC switching power source circuit 17, the switching circuit is turned off so as not to be simultaneously turned on upon charging by the output of the stop signal forming circuit 19. Further, in case of inserting the switching circuit for disconnecting the battery unit 16 and DC/DC switching power source circuit 17, it is also possible to control in a manner such that a detecting circuit for detecting a state of the switching circuit and a stop signal forming circuit are provided, a stop output of the stop signal forming circuit is supplied to the switching circuit 15, and when the DC/DC switching power source circuit 17 operates, the switching circuit 15 is not simultaneously turned on.

Although the case where a plurality of lithium ion batteries are used for the battery unit 16 has been described in the embodiment and the other embodiment of the invention mentioned above, a charging circuit can be also provided between the switching circuit 15 and battery unit 16 or between the switching circuit 35 and battery unit 16. A nickel-cadmium battery, a nickel-hydrogen battery, or the like can be also used as a secondary battery. The optimum charging is performed to each secondary battery.

Further, although the case of extracting the output voltage of the DC/DC switching power source circuit 17 via the switching circuit 13 has been described in the foregoing embodiment of the invention, the output voltage of the DC/DC switching power source circuit 17 can be also directly supplied to one terminal 14a of the connector 14 without passing through the switching circuit 13.

In the invention, the voltage converting means, battery unit, first and second switching means, and control means are provided and it is constructed lest the first and second switching means are not simultaneously turned on. According to the invention, therefore, after confirming that the first switching means was turned on or off, the second switching means is turned off or on. Similarly, after confirming that the second switching means was turned on or off, the first switching means is turned off or on. Therefore, since the power source unit operates without a problem even if a chattering occurred, the charging and discharging to/from the secondary battery can be strictly managed and the reliability can be further raised.

The present invention is not limited to the foregoing embodiments but many modifications and variations are possible within the spirit and scope of the appended claims of the invention.

What is claimed is:

1. A power source unit which is arranged between a commercially available power source and an electronic apparatus having a secondary battery therein and supplies an output voltage to said electronic apparatus, comprising:

voltage converting means for converting a voltage of the commercially available power source into a predetermined regulated DC voltage which is necessary for the electronic apparatus;

a battery unit constructed by a plurality of secondary batteries;

first switching means which is inserted between said voltage converting means and said battery unit;

second switching means which is inserted between said voltage converting means and a power output terminal;

control means for turning off said second switching means when said first switching means is ON and turning off said first switching means when said second switching means is ON;

second voltage converting means for converting a voltage of said battery unit into a predetermined regulated DC voltage which is necessary for said electronic apparatus; and second control means for making said second voltage converting means inoperative when said voltage converting means is operating.

2. A unit according to claim 1, further comprising:

third switching means which is inserted between said battery unit and said second voltage converting means, and wherein said control means further controls so as to turn off said first switching means when said third switching means is ON.

3. A power source unit which is arranged between a commercially available power source and an electronic apparatus having a secondary battery therein and supplies an output voltage to said electronic apparatus, comprising:

voltage converting means for converting a voltage of the commercially available power source into a predetermined regulated DC voltage which is necessary for the electronic apparatus;

a battery unit constructed by a plurality of secondary batteries;

first switching means which is inserted between said voltage converting means and said battery unit;

second switching means which is inserted between said voltage converting means and a power output terminal;

control means for turning off said second switching means when said first switching means is ON and turning off said first switching means when said second switching means is ON; and output setting means for varying an output of said voltage converting means by using an output of said control means in an interlocking relational manner with states of said first and second switching means.

* * * * *